May 26, 1959  G. O. W. OLSON  2,888,178
ATTACHABLE AND DETACHABLE CAR TOP CARRIER
Filed Feb. 21, 1956
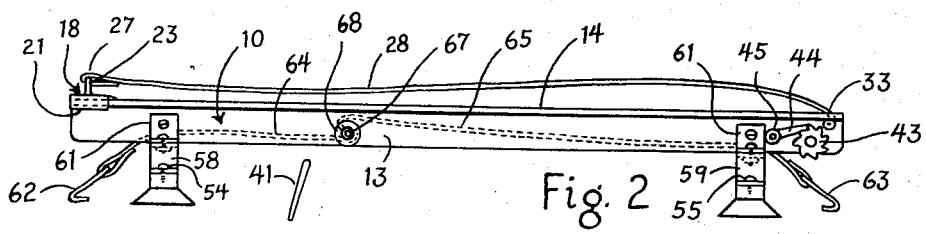
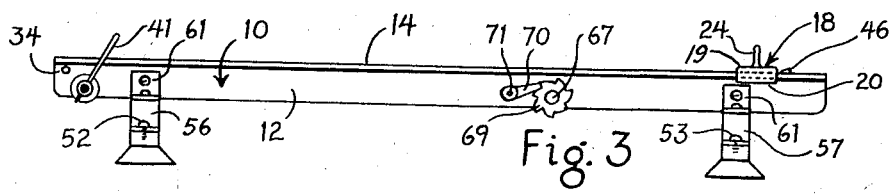
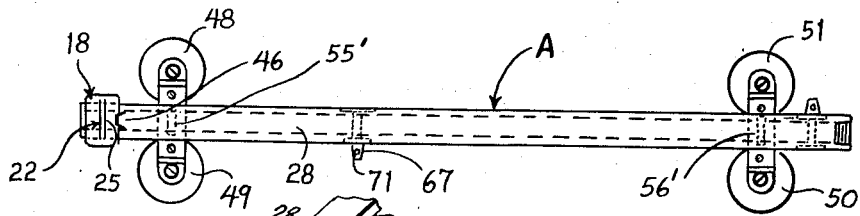
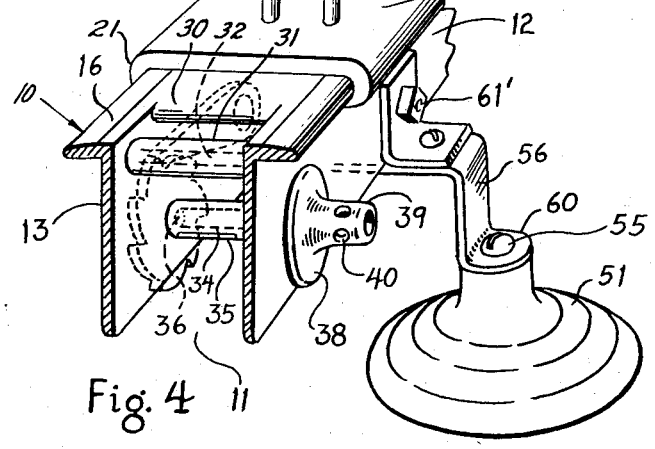
GEORGE O. W. OLSON INVENTOR
BY *Robert M. Dunning*
ATTORNEY

United States Patent Office 2,888,178
Patented May 26, 1959

2,888,178

ATTACHABLE AND DETACHABLE CAR TOP CARRIER

George O. W. Olson, St. Paul, Minn.

Application February 21, 1956, Serial No. 566,849

4 Claims. (Cl. 224—42.1)

This invention relates to an improved attachable and detachable car top carrier. More particularly, the improvement concerns an improved car top mounting bar in combination with a single slide adjustable throughout the length of the bar and simple easily tightening strap elements for fastening various sized objects over the top of the tightening bar and the carrier securely to the top rim of an automobile, with elimination of the use of conventional buckles and finger straining straps.

The provision of auto top carriers which are buckled down by hand straps at each end with additional straps or clamps to securely mount luggage, boats and other articles on the carriers of the character of car or auto top carriers are well known. However, the relative difficulty of strapping the carriers to a vehicle top and then strapping articles down on the carrier with threading, pulling and tightening of the straps by the fingers and the hand grasping of the straps are well known to result in broken fingernails, looseness of the straps and other inconvenience.

Accordingly, it is an object of this improvement to eliminate many of the inconveniences of hand threading and pulling of each of the straps of the auto top carrier. It is another object of this improvement to provide a car top carrier with a slide rail having a clamp movable over the length of the rail and held in frictional engagement at any suitable article holding position along the length thereof by a flexible strap fastened at one end of the carrier.

An additional object of the improvement in car top carriers is to provide a single adjustable article holding strap adjustable across the length thereof and a pair of simultaneously operable roof type clamps or hooks which fasten and lock the carrier to the rim upon a car top edge.

A further object is to provide in combination a conveniently mountable car top carrier having a plurality of pivotal strap operating and locking mechanisms operable by a hand lever to fasten the carrier to a car top and also secure objects thereon.

Further objects and advantages will be apparent from the following description of the accompanying drawings, wherein:

Figure 1 is a top plan view of my improved auto and car top carrier as embodied in this disclosure.

Figure 2 is a side plan view of the structure shown in Figure 1.

Figure 3 is an opposite side plan view of the structure shown in Figure 2, without the strap elements shown therewith.

Figure 4 is a right end perspective of the structure shown in Figures 1 and 2, or the left end of Figure 3.

With reference to the drawings, like parts in the separate views will be similarly indicated.

In the present disclosure, the auto or car top carrier A is an inverted channel-shaped member 10 having an open bottom 11 with parallel sides 12 and 13. An integral top 14 closes one end of the channel-shaped carrier A. This top 14 has integral side edges 15 and 16 extending in overlapping relationship and at right angles to the walls 12 and 13, respectively, and serve as locking slides for a rider element 18 movable across the length of the carrier top 14, in the manner as hereinafter described.

The rider element 18 is a clamp shaped piece having a flat top portion 19, which rides over the surface of top 14, and inwardly curved side edges 20 and 21, which serve as hooks or holding clamps riding in a somewhat loose or free slippage relationship along the underside of edges 15 and 16, respectively, when no pressure tending to tip the rider 18, is applied. An inverted U-shaped loop 22 has its leg portions 23 and 24 spot-welded to, or is otherwise formed as an integral portion of, the top 19 of rider element 18. The connecting base 25 of the rider 18 forms a fastening element for the one end 27 of a relatively flexible article holding strap 28. The pull of the strap 28 on loop 22 tips the rider 18 and inturned edges 20 and 21 to bind the rider top 19 against the top 14, of the car carrier A, at any desired point along the length of the top 14.

As illustrated in Figures 1 and 2 in conjunction with Figure 4, the one end of the car carrier A is provided with a guide, roller and wind-up arrangement for the opposite end of strap 28. That is, the top 14 is provided with a cut-in notch 30 which serves as a guide for strap 28. A roller 31 is mounted on a shaft 32, which has its opposite ends, as at 33 (one end only being shown), mounted in suitable apertures in walls 13 and 12, respectively, and spot-welded thereto. Beneath the roller 31, and in somewhat offset relationship thereto, is mounted a rotatable wind-up shaft 34, having a slot 35 cut therethrough for securing the one free end of strap 28 to the shaft 34.

The shaft 34 extends through suitable apertures, as illustrated at 36 in wall 13, in each of the walls 12 and 13. The one end of shaft 34, extending through wall 12, is provided with a hub 38 and end 39 extending beyond the edge 15. The end 39 has one or more apertures 40 therethrough, into which an elongated lever or tool 41 can be inserted for rotating the shaft 34 and wind up the strap 28 thereon. On the end of shaft 34, extending through the wall 13, is mounted a ratchet wheel 43, cooperable with pawl 44 to prevent unwinding or reverse turning of the shaft 34 when a desired tension is applied to strap 28. A pin 45 is spot-welded or otherwise secured to wall 13 and serves to mount the pawl 44 in pivotal relationship with ratchet wheel 43.

With the free end of strap 28 secured in slot 35, roller 31 permits free slippage of strap 28 over guide 30 and tool 41 can be inserted into an aperture 40, to serve as a lever, for winding the strap 28 on shaft 34. Ratchet wheel 43 then serves to hold the strap 28 under continued tension without danger of slippage or unwinding of the strap 28 upon normal pull or stress under loaded conditions of the carrier A. Under some loaded and otherwise unloaded conditions, the strap 28 can be relatively completely wound upon the shaft 34 with rider element immediately adjacent the roller 31 on top 41. Otherwise, a raised lug 46 is punched from top 14, the end thereof, to serve as an extra catch for the leaning edge of element 18, when the opposite end of strap 28 is wound on shaft 34. The rider element 18, loosely mounted on top 14, as described, can be lifted sufficiently high to ride over lug 46 when the strap 28 is loosened.

In order to mount the carrier A to a roof top there are provided pairs of conventional suction cups 48, 49 and 50, 51, mounted by suitable bolts or screws 52, 53, 54 and 55 to the legs 56, 57, 58 and 59. The legs 56, 57, 58 and 59 are formed as U-shaped bars having their bases 55 and 56 as illustrated by 56 in Figure 4 underlying the open end of channel bar 10. As representatively shown in Figure 4, each of the legs, as indicated, by leg 56, are provided with their ends as at 60, bent at right angles to the relative leg portions, as 56, and having suitable apertures (not shown) through which the suction cup fastening bolts or screws, as represented by 55, are mounted. Right angularly shaped brackets 61 are spot welded or attached at one end by suitable conventional nuts and bolts 61' to the side walls 12 and 13 of channel member 10 and on the other end to bases 55' and 56', by similar conventional spot welding or nut bolt means, to secure the legs 56, 57, 58 and 59 to the channel member 10 and provide a standard therefor.

Supplementing the suction cups, as described, are top rim fastening hooks 62 and 63, attached to straps 64 and 65, which are threaded over round spreader bars 55' and 56', respectively, and fastened at their inner ends about a wind-up shaft 67. The shaft 67 extends through suitable apertures (not shown) in the sides 12 and 13. One end of the shaft 67 is secured by an integral collar 68 and the opposite end of the shaft is secured or spot welded to a ratchet wheel 69. Associated with the ratchet wheel 69 is a locking pawl 70 to prevent unwinding of the straps 64 and 65 when placed under tension to hold the carrier A onto a car top. One end of pawl 70 is pivotally mounted by pin 71 which is spot welded or otherwise attached to wall 12, and permits the opposite end of pawl 70 to engage the teeth of the ratchet wheel 69, in a conventional manner.

The one end of shaft 67 extends beyond the edge 16 of top 14 and is provided with one or more apertures 72 into which the tool 41 is adapted to be inserted for winding up the straps 64 and 65 on shaft 67.

Thus, when one or more of the carriers A are positioned on a car top, the single turn up shaft 67 provides a single hand operation to tighten the carrier or carriers down and provides also, a one hand operation to tighten down the carrier strap 28, as described. To loosen the straps 28, 64 and 65, shafts 34 and 67 are turned forwardly sufficiently to lift or lock pawls 44 and 70 from ratchet wheels 43 and 69, respectively, and permit unwinding by reverse turning of the shafts 43 and 67.

In accordance with the patent statutes, I have described the principles of construction and operation of my improved attachable and detachable car top carrier, and while I have endeavored to set forth the best embodiment thereof, I desire to have it understood that obvious changes may be made within the scope of the following claims without departing from the spirit of my invention.

I claim:

1. An automobile top carrier comprising in combination an elongated member of inverted channel shaped cross-section, mounting standards near each end of said member extending beneath said member, a wind up shaft extending through the sides of said channel shaped member between said mounting standards, a locking means cooperable between said shaft and said member, a pair of flexible straps secured to said shaft to be wound thereon upon rotation of said shaft, a hook on each said strap, said strap extending in opposite directions from said shaft through said channel and over a corresponding of said mounting standards and extendable downwardly therefrom for engagement with opposite sides of the automobile top.

2. The structure of claim 1 and including a strap carrier including a rider slidably supported on the top of said member, a strap anchored thereto, a wind up shaft extending between the sides of said channel near an end thereof, and guide means adjoining said channel end, the other end of said last named strap extending over said guide means and secured to said last named shaft, and means for locking said shaft from rotation to hold said last named strap under tension.

3. An automobile top carrier including an elongated member having a horizontal top and depending parallel sides, a shaft extending through said sides intermediate the ends of said member, a pair of straps secured to said shaft and extending in opposite directions therefrom between said sides, a strap guide member extending between said sides spaced from said top over which said straps may extend, a hook member connected to each strap, supporting standards on said member near opposite ends thereof, and means locking said shaft from rotation to hold said straps under tension.

4. The structure of claim 3 and including a strap carrier on said member, said carrier including a rider supported by said member, a flexible strap anchored at one end to said rider, a shaft supported by said sides near an end of said member to which the other end of said strap is secured, guide means on said one end of said member over which said strap extends, and means engageable with said last named shaft for holding said shaft from rotation when said strap is under tension.

References Cited in the file of this patent

UNITED STATES PATENTS

| | | |
|---|---|---|
| 2,165,603 | Yeats | July 11, 1939 |
| 2,434,387 | Brandt | Jan. 13, 1948 |

FOREIGN PATENTS

| | | |
|---|---|---|
| 216,092 | Switzerland | Nov. 17, 1941 |
| 789,793 | France | Aug. 26, 1935 |